US011957958B2

(12) United States Patent
Rosenow et al.

(10) Patent No.: US 11,957,958 B2
(45) Date of Patent: Apr. 16, 2024

(54) STOWABLE WHEELED WEIGHT TRAINING SLED

(71) Applicant: Torque Fitness, LLC, Coon Rapids, MN (US)

(72) Inventors: Charles J. Rosenow, Ramsey, MN (US); Thomas K. Baumler, Ramsey, MN (US)

(73) Assignee: TORQUE FITNESS, LLC, Coon Rapids, MN (US)

( * ) Notice: Subject to any disclaimer, the term of this patent is extended or adjusted under 35 U.S.C. 154(b) by 175 days.

(21) Appl. No.: 17/449,113

(22) Filed: Sep. 28, 2021

(65) Prior Publication Data

US 2022/0111251 A1 Apr. 14, 2022

Related U.S. Application Data

(60) Provisional application No. 63/089,228, filed on Oct. 8, 2020.

(51) Int. Cl.
*A63B 23/04* (2006.01)
*A63B 21/00* (2006.01)
(Continued)

(52) U.S. Cl.
CPC ........ *A63B 23/047* (2013.01); *A63B 21/0004* (2013.01); *A63B 21/0618* (2013.01);
(Continued)

(58) Field of Classification Search
CPC ....... A63B 23/047; A63B 69/34; A63B 22/20; A63B 2210/50; A63B 2022/0082;
(Continued)

(56) References Cited

U.S. PATENT DOCUMENTS 2,973,203 A 2/1961 Taylor
3,007,699 A 11/1961 Taylor
(Continued)

FOREIGN PATENT DOCUMENTS

CN 101557978 A 10/2009
CN 203473173 U 3/2014
(Continued)

OTHER PUBLICATIONS https://web.archive.org/web/20151026132542/http://www.armoredfitness.com:80/.

*Primary Examiner* — Andrew S Lo
(74) *Attorney, Agent, or Firm* — SHERRILL LAW OFFICES, PLLC

(57) ABSTRACT

A weight training sled and wall hanging bracket set for supporting the weight training sled in an elevated vertical stowage position. The push handles on the sled are pivotable as a unit about a laterally extending pivot axis as between an upward use position and a lowered stowage position extending towards the second longitudinal end of the chassis. The wall hanging bracket set includes an upper bracket for attachment to a vertical surface and supportively contact a second longitudinal end of the sled at two laterally spaced contact points, and a lower bracket for attachment to the vertical surface and supportively contact a first longitudinal end of the sled at a single contact point.

3 Claims, 15 Drawing Sheets

(51) Int. Cl.
*A63B 21/06* (2006.01)
*F16M 13/02* (2006.01)

(52) U.S. Cl.
CPC ....... *F16M 13/02* (2013.01); *A63B 21/00192* (2013.01); *A63B 2210/54* (2013.01)

(58) Field of Classification Search
CPC ................ A63B 21/0618; A63B 21/00; A63B 23/03575; A63B 21/4043; A63B 21/0004; A63B 2210/54; A63B 21/06; B62B 1/042
See application file for complete search history.

(56) References Cited

U.S. PATENT DOCUMENTS

| | | | |
|---|---|---|---|
| 3,062,548 A | 11/1962 | Foster et al. | |
| 3,326,553 A | 6/1967 | Forrest | |
| 3,684,283 A | 8/1972 | Forrest | |
| 3,950,817 A | 4/1976 | McKaig | |
| 4,302,023 A | 11/1981 | Kiesz | |
| 4,451,037 A | 5/1984 | O'Hare | |
| 4,867,439 A | 9/1989 | Salyer | |
| 5,228,716 A * | 7/1993 | Dahl | B62B 1/002 D34/17 |
| 5,454,577 A | 10/1995 | Bell | |
| 5,810,697 A | 9/1998 | Joiner | |
| 5,927,732 A | 7/1999 | Snyder | |
| 6,086,517 A | 7/2000 | Schapmire | |
| 6,190,293 B1 | 2/2001 | Schuyler et al. | |
| 6,276,700 B1 | 8/2001 | Way et al. | |
| 6,287,240 B1 | 9/2001 | Trabbic | |
| 6,302,421 B1 | 10/2001 | Lee | |
| 6,761,650 B1 | 7/2004 | Dettmann | |
| 6,877,764 B2 * | 4/2005 | Sagol | B62B 5/06 280/655 |
| 6,942,585 B1 | 9/2005 | Krause | |
| 7,562,729 B2 | 7/2009 | Hammerle | |
| 7,678,026 B2 | 3/2010 | Lewis | |
| 7,972,224 B2 | 7/2011 | Gilman | |
| 7,985,166 B2 | 7/2011 | Farnsworth et al. | |
| 8,328,664 B2 | 12/2012 | Krause | |
| 8,469,861 B1 | 6/2013 | McFee et al. | |
| 8,617,007 B2 | 12/2013 | Gilman | |
| 8,858,405 B2 | 10/2014 | Agate | |
| 8,905,901 B2 | 12/2014 | Stewart et al. | |
| 9,017,223 B2 | 4/2015 | Eschembach | |
| 9,126,611 B2 | 9/2015 | Liu | |
| 9,144,708 B2 | 9/2015 | Selek | |
| 9,192,803 B2 | 11/2015 | Cayo | |
| 9,289,668 B2 | 3/2016 | Gilman | |
| 9,604,086 B2 | 3/2017 | Meredith et al. | |
| 9,610,989 B2 | 4/2017 | Marchetti | |
| 9,643,040 B1 | 5/2017 | Guerrero Diaz | |
| 10,220,233 B2 | 3/2019 | Schmidt et al. | |
| 10,246,115 B2 | 4/2019 | Ryan | |
| 10,398,926 B2 | 9/2019 | Baumler et al. | |
| 10,398,927 B2 * | 9/2019 | Baumler | A63B 21/0618 |
| 10,500,432 B2 | 12/2019 | Bentley | |
| 10,576,322 B2 | 3/2020 | Schlegel | |
| 10,799,750 B2 | 10/2020 | Baumler et al. | |
| 11,179,591 B1 * | 11/2021 | Bazargan | A63B 69/34 |
| 2002/0109399 A1 | 8/2002 | Papac | |
| 2004/0002413 A1 | 1/2004 | Wimber | |
| 2005/0164850 A1 | 7/2005 | Leibowitz | |
| 2005/0272572 A1 | 12/2005 | Lewis | |
| 2007/0249472 A1 | 10/2007 | Frei | |
| 2008/0081741 A1 | 4/2008 | Sargen et al. | |
| 2010/0048368 A1 | 2/2010 | Donofrio | |
| 2010/0203986 A1 | 8/2010 | Gilman | |
| 2010/0240499 A1 | 9/2010 | Lewis | |
| 2013/0143719 A1 | 6/2013 | Selek | |
| 2013/0172159 A1 | 7/2013 | Stewart et al. | |
| 2014/0073491 A1 | 3/2014 | Gilson | |
| 2014/0206508 A1 | 7/2014 | Hall | |
| 2014/0221131 A1 | 8/2014 | Gilman | |
| 2017/0189733 A1 | 7/2017 | Bentley | |
| 2017/0313334 A1 | 11/2017 | Ryan | |
| 2017/0326402 A1 | 11/2017 | Sorin et al. | |
| 2018/0243597 A1 | 8/2018 | Schlegel | |
| 2018/0311522 A1 | 11/2018 | Schmidt et al. | |
| 2018/0326248 A1 * | 11/2018 | Baumler | A63B 21/0056 |
| 2021/0121727 A1 | 4/2021 | Baumler et al. | |

FOREIGN PATENT DOCUMENTS

| | | |
|---|---|---|
| DE | 19748215 C1 | 2/1999 |
| KR | 102077546 B1 | 2/2020 |
| WO | 2009129564 A1 | 10/2009 |
| WO | 2011/150519 A2 | 12/2011 |
| WO | 2014039059 A1 | 3/2014 |
| WO | 2017/136560 A1 | 8/2017 |
| WO | 2019/090121 A1 | 5/2019 |

* cited by examiner

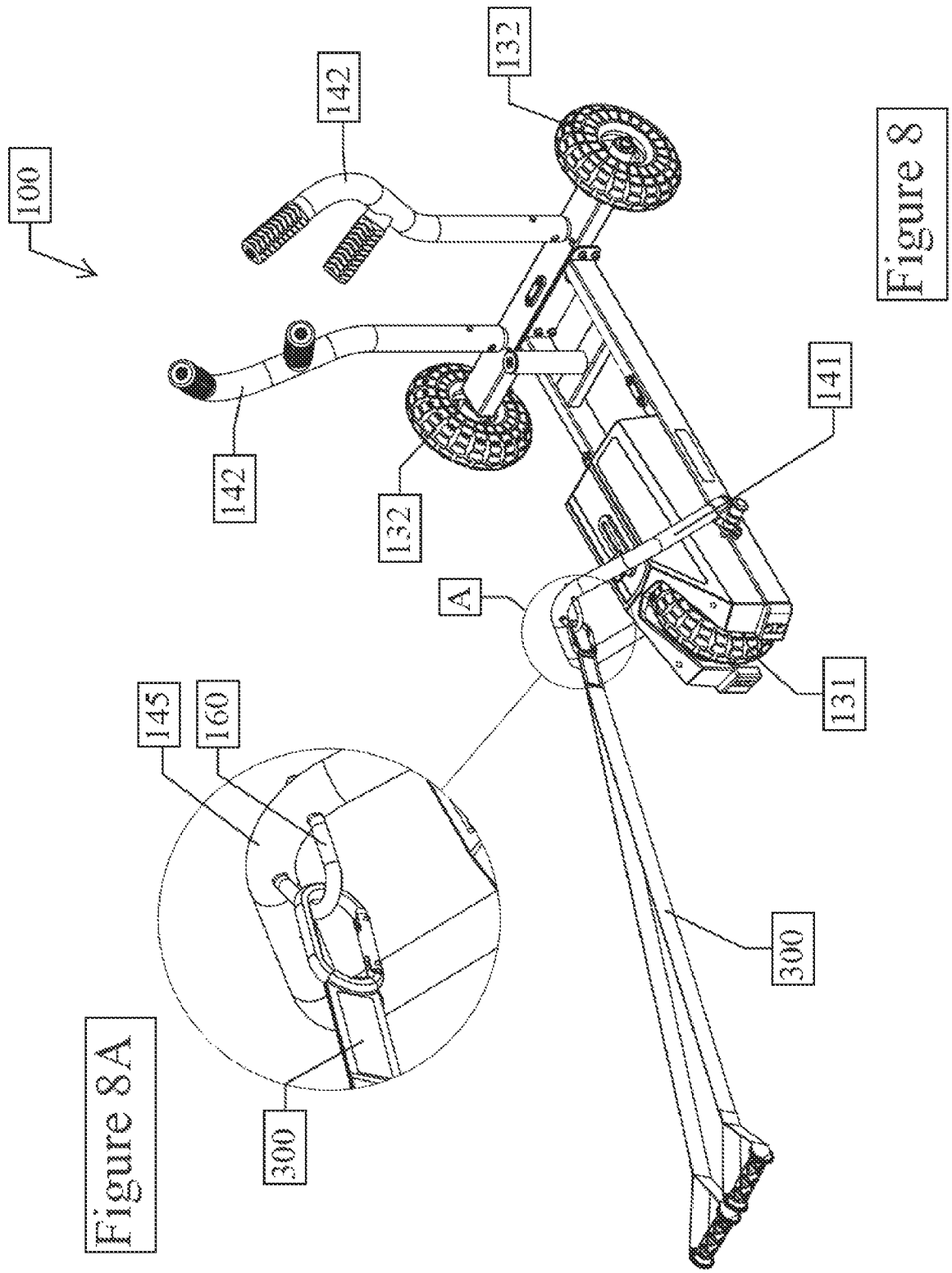

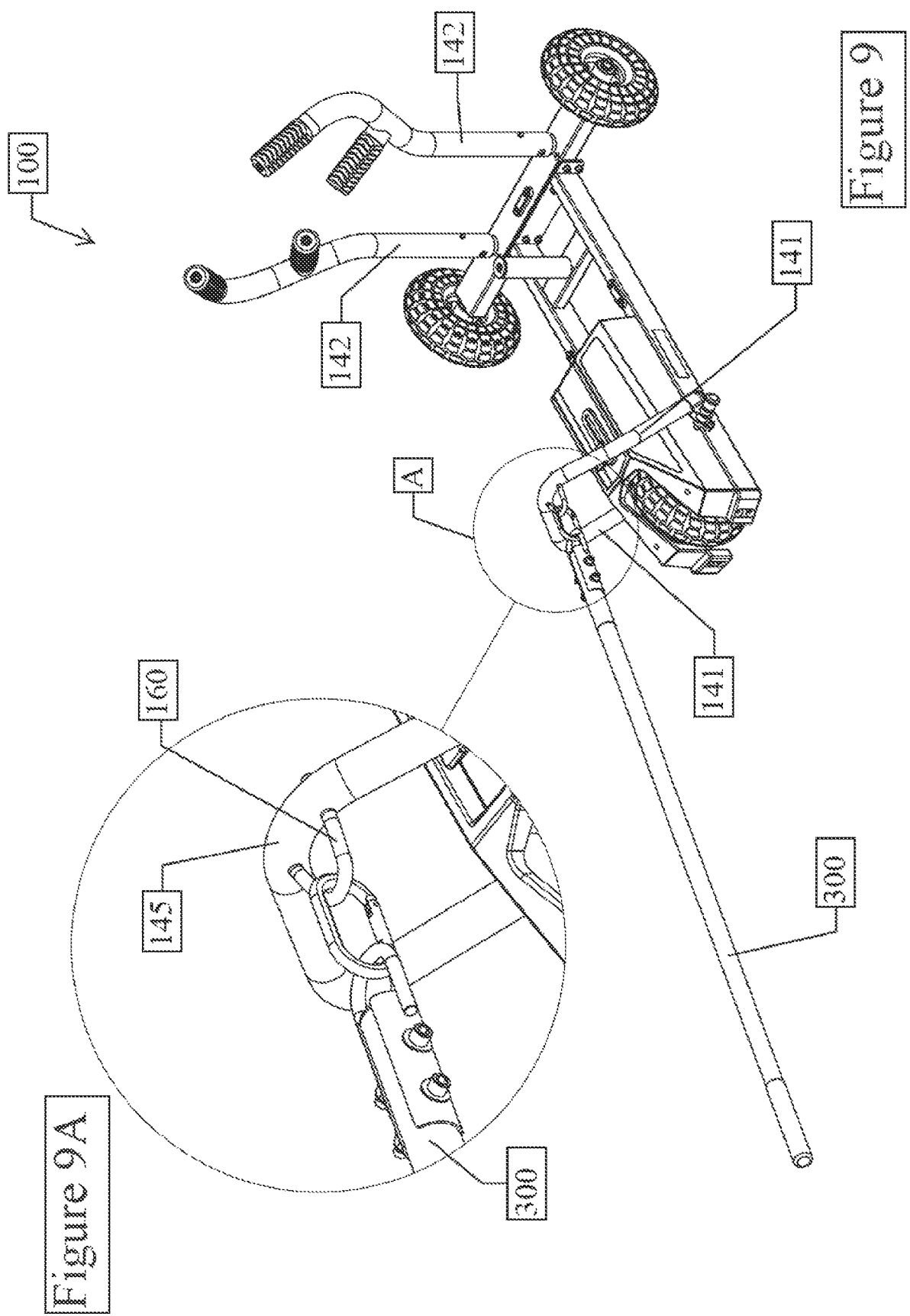

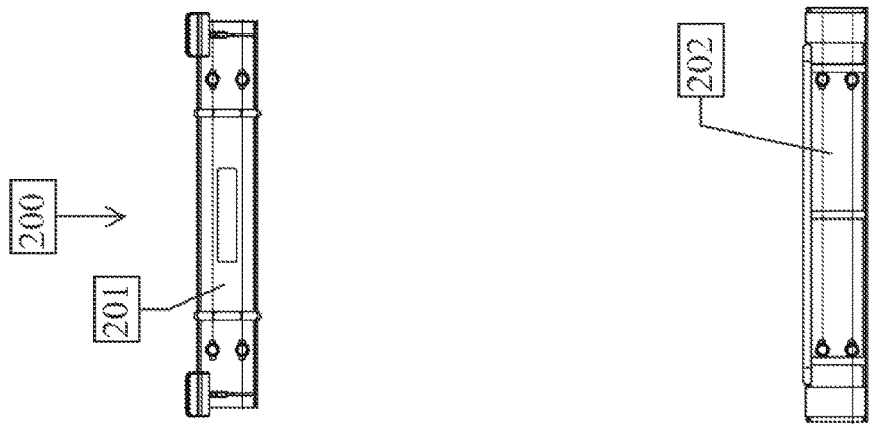
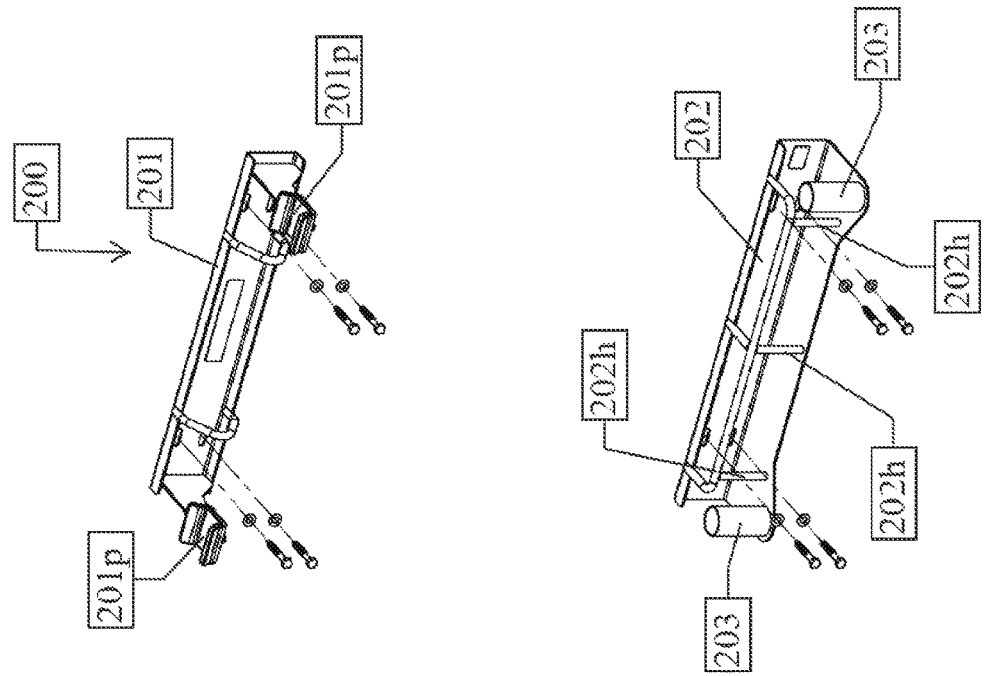

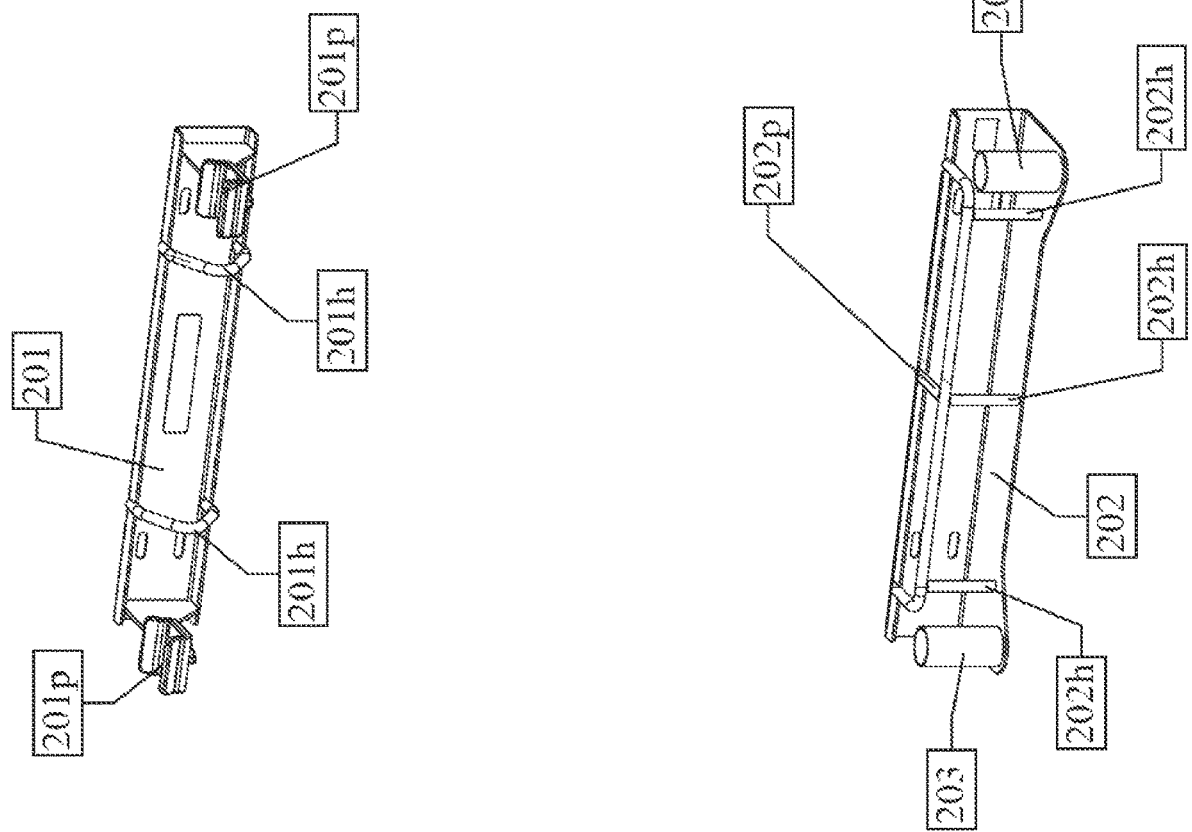

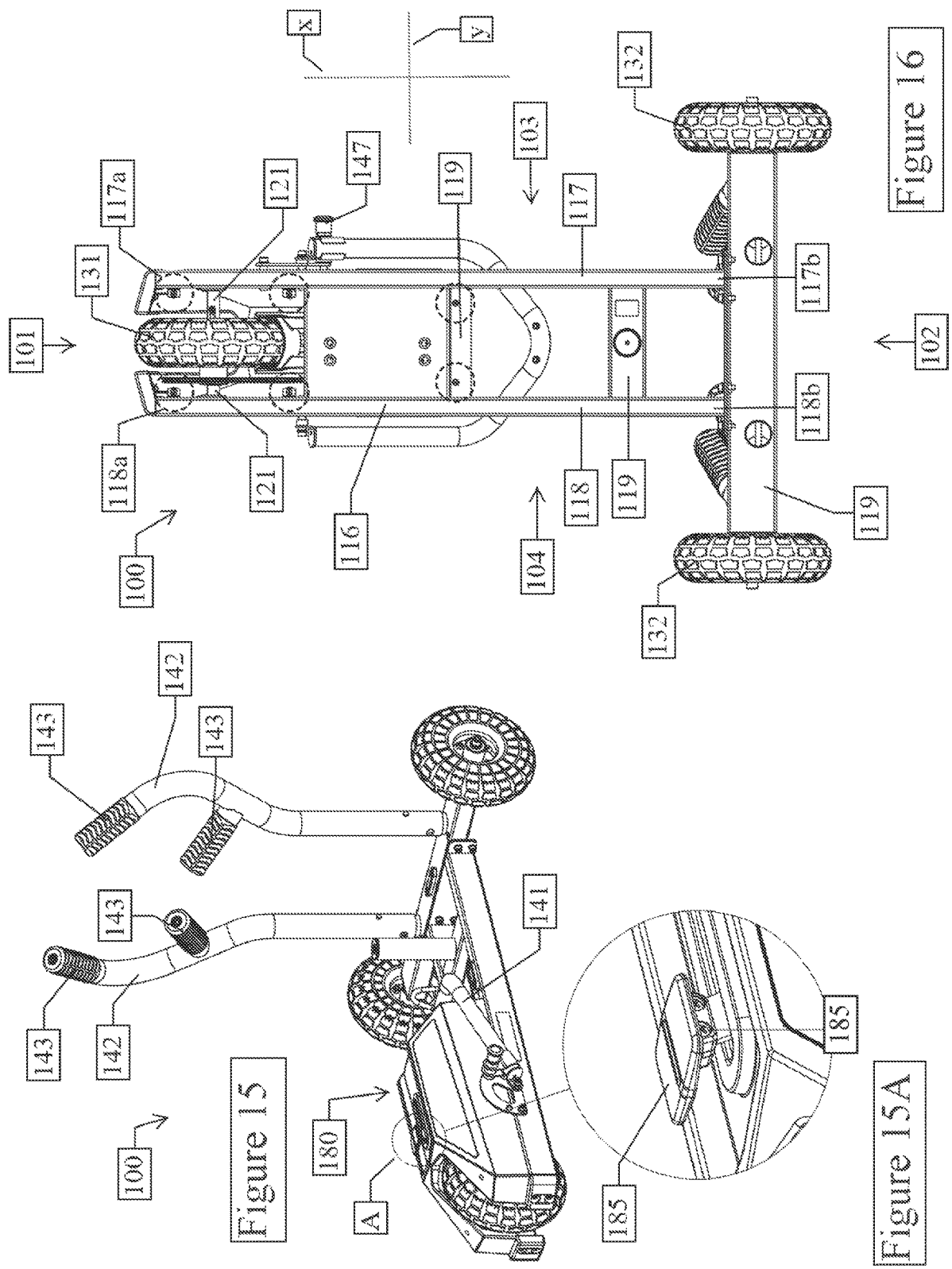

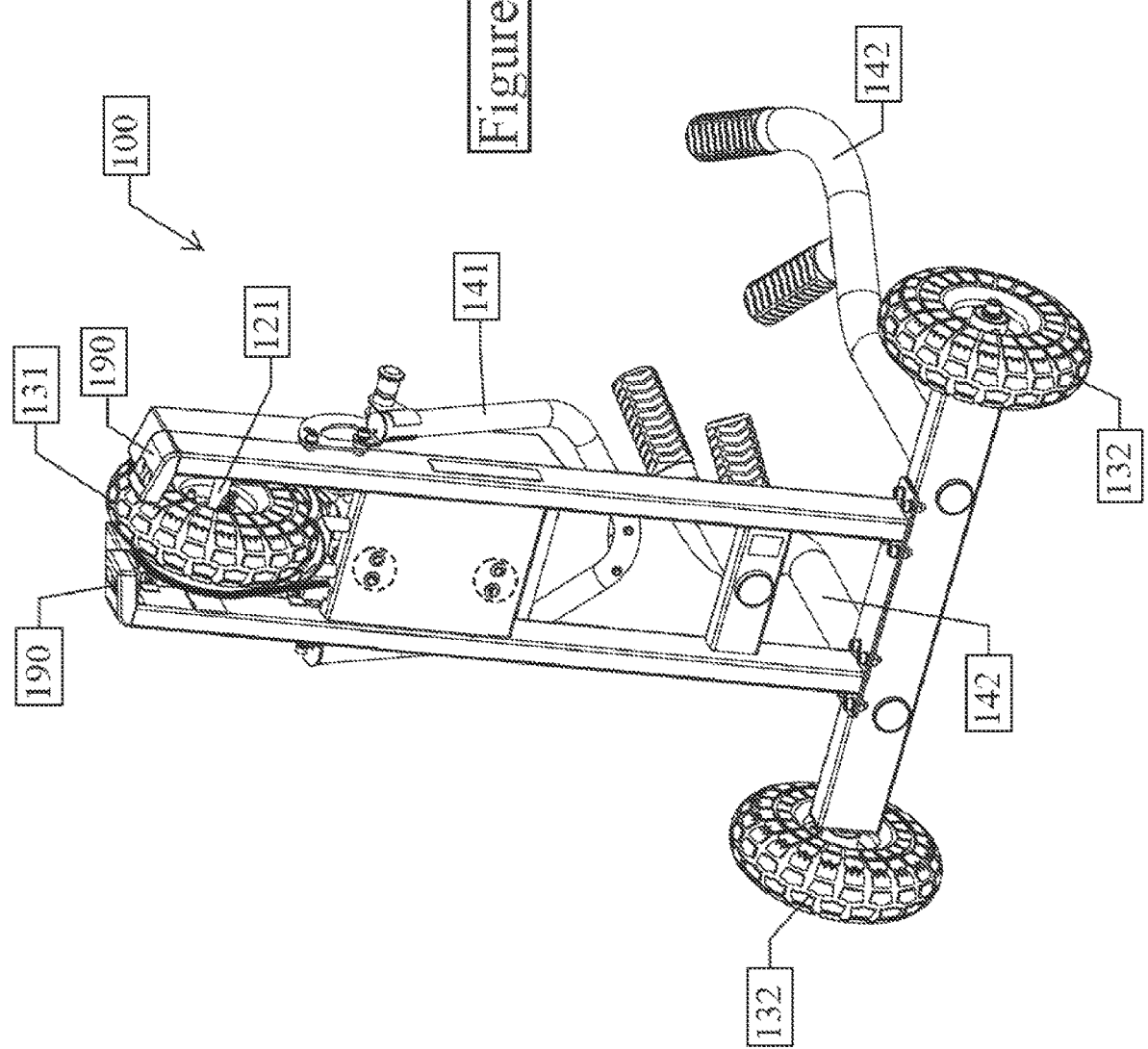

STOWABLE WHEELED WEIGHT TRAINING SLED

BACKGROUND

Weight sleds have become an increasingly popular exercise device in indoor health and fitness clubs, many of which have limited open space. Weight sleds, also known as blocking sleds, typically support weights upon one or more skids which exert frictional resistance against movement of the sled. An exemplary traditional weight sled is depicted in US Patent Application Publication 2014/0073492. Weight sleds were originally designed for outdoor use where space and the damage caused by the frictional sliding of the skids against the ground were of little concern. The transition from outdoor to indoor use has come with certain challenges, including the need for substantial open space and installation of flooring that can withstand the abrasive effects of repetitive frictional sliding of the skids over the flooring.

Wheeled version of blocking sleds are depicted in U.S. Pat. No. 3,326,553 (a three wheeled skid-steer version) and U.S. Pat. No. 6,942,585 (a single wheel version) whereby frictional skidding is substantially eliminated, but at the expense of a loss in stability when pushing the sled—resulting in the need for an onboard operator to steer the sled of U.S. Pat. No. 3,326,553, or the need for additional space to accommodate the uncontrolled instability of the sled of U.S. Pat. No. 6,942,585.

Stable wheeled weight training sleds are disclosed in U.S. Pat. Nos. 10,398,926, 10,398,927 and 10,799,750. While these weight training sleds constitute a significant advance over prior weight training sleds, a need still exists for a compact, lighter weight wheeled weight training sled.

SUMMARY OF THE INVENTION

The invention is directed to a weight training sled and wall hanging bracket set for supporting the weight training sled in an elevated vertical stowage position.

The weight training sled is a wheeled weight training sled that includes (a) a chassis having longitudinally spaced first and second ends and laterally spaced first and second sides, (b) at least two longitudinally spaced rotatable wheels for supporting the chassis a vertical distance above a support surface, (c) a brake for applying resistance to rotation of at least one of the wheels, (d) a first pair of laterally spaced push handles extending upward from proximate a first longitudinal end of the chassis, and (e) a second pair of laterally spaced push handles extending from proximate a second longitudinal end of the chassis wherein the first pair of push handles are pivotable as a unit about a laterally extending pivot axis as between an upward use position and a lowered stowage position extending towards the second longitudinal end of the chassis.

The wall hanging bracket set, comprising (a) an upper laterally elongated bracket configured and arranged for attachment to a vertical surface and supportively contact a second longitudinal end of the sled at two laterally spaced contact points when attached to the vertical surface, and (b) a lower laterally elongated bracket configured and arranged for attachment to the vertical surface and supportively contact a first longitudinal end of the sled at a single contact point when attached to the vertical surface at a defined distance away from and vertically below the attached upper bracket.

In a preferred embodiment, the wall hanging bracket set includes at least one hook or loop available for use in attaching one end of a battle rope or resistance band while a weight training sled is supported upon the hanging bracket set. The at least one hook or loop can be provided on either the upper or lower bracket, with a preference for providing at least one hook or loop on each of the upper and lower brackets.

BRIEF DESCRIPTION OF THE DRAWINGS

FIG. 4A is an enlarged view of a portion of the invention depicted in FIG. 4 encircled by A.

FIG. 8 is a perspective view of the invention depicted in FIG. 1 with a pull strap attached to the tow hook.

FIG. 8A is an enlarged view of a portion of the invention depicted in FIG. 8 encircled by A.

FIG. 9 is a perspective view of the invention depicted in FIG. 1 with a pull rope attached to the tow hook.

FIG. 9A is an enlarged view of a portion of the invention depicted in FIG. 9 encircled by A.

FIG. 10 is a front perspective view of one embodiment of a wall hanging bracket set in accordance with the invention.

FIG. 11 is a front view of the invention depicted in FIG. 10.

FIG. 14 is an enlarged front perspective view of the invention depicted in FIG. 10.

FIG. 15 is a perspective view of the invention depicted in FIG. 1 with the first pair of push handles pivoted into the stowage position.

FIG. 15A is an enlarged view of a portion of the invention depicted in FIG. 15 encircled by A.

FIG. 16 is a bottom view of the invention depicted in FIG. 1 with the first pair of push handles pivoted into the stowage position.

FIG. 17 is a bottom perspective view of the invention depicted in FIG. 16.

DETAILED DESCRIPTION OF A PREFERRED EMBODIMENT

Definitions

Figure 1:
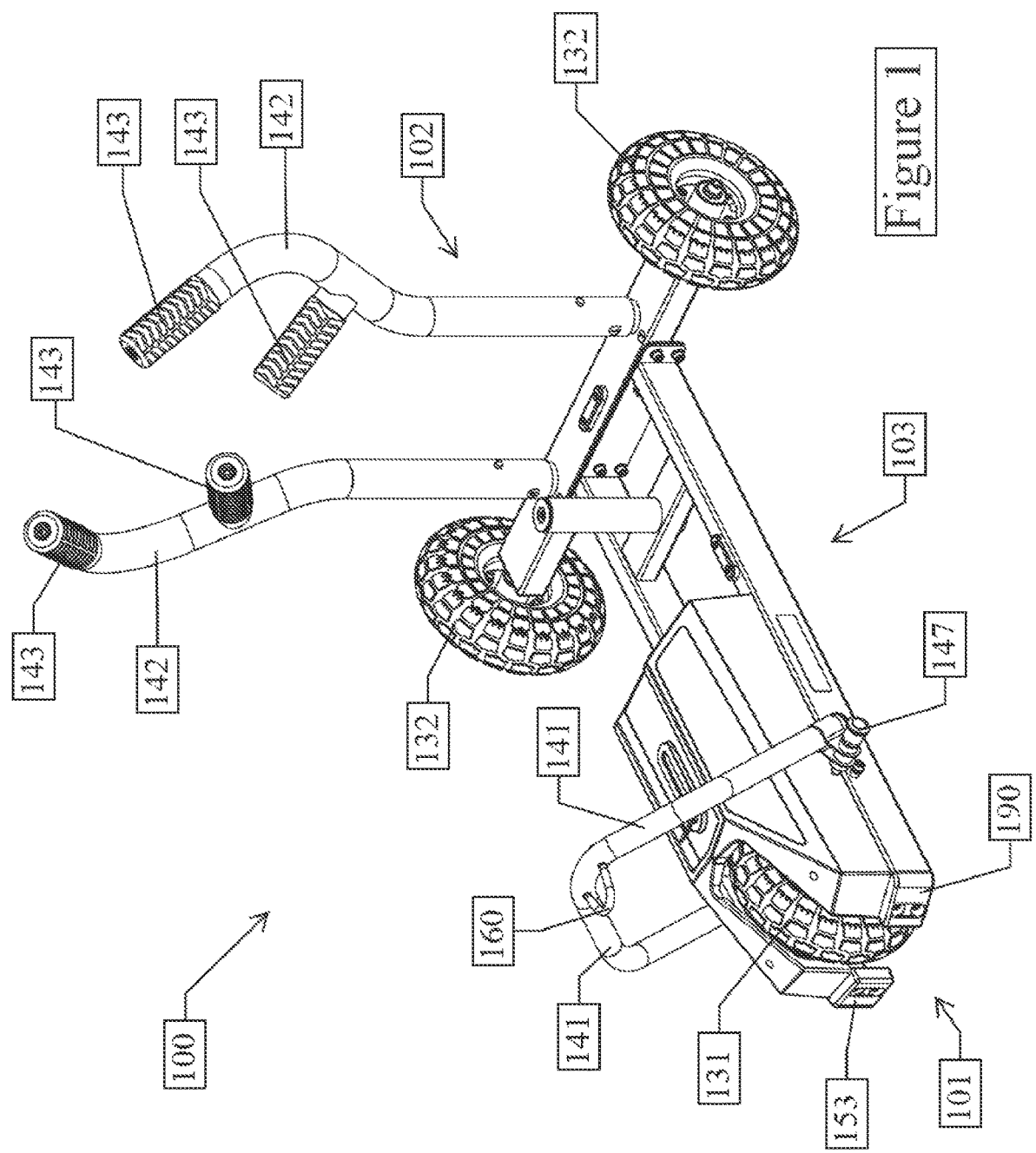
FIG. 1 is a front perspective view of one embodiment of a weight training sled in accordance with the invention, with the first pair of push handles pivoted into the use position.

As utilized herein, including the claims, the term "neutral resistance" means resistance at or near zero, whereby the wheeled exercise sled of the present invention is rendered suitable for use as a wheeled transport wagon when the braking mechanism is set to neutral.

NOMENCLATURE TABLE

| REF. NO. | NAME |
| --- | --- |
| 100 | Wheeled Weight Training Sled |
| 101 | First End of Weight Training Sled |
| 102 | Second End of Weight Training Sled |
| 103 | First Side of Weight Training Sled |
| 104 | Second Side of Weight Training Sled |
| 110 | Chassis |
| 111 | First End of Chassis |
| 112 | Second End of Chassis |
| 113 | First Side of Chassis |
| 114 | Second Side of Chassis |
| 115 | Top of Chassis |
| 116 | Bottom of Chassis |
| 117 | First Side Rail of Chassis |
| 117a | First End of First Side Rail |
| 117b | Second End of First Side Rail |
| 118 | Second Side Rail of Chassis |
| 118a | First End of Second Side Rail |
| 118b | Second End of Second Side Rail |
| 119 | Cross Beams Interconnecting Side Rails |
| 120 | Axles |
| 121 | First Axle |
| 122 | Second Axle |
| 130 | Wheels |
| 131 | Front Wheel(s) |
| 132 | Rear Wheel(s) |
| 140 | Push Handles |
| 140d | Distal End of Push Handles |
| 140p | Proximal End of Push Handles |
| 141 | First Pair of Push Handles |
| 142 | Second Pair of Push Handles |
| 143 | Grips on Each Push Handle |
| 145 | Interconnecting Member |
| 146 | Pivot Axis for First Pair of Push Handles |
| 147 | Locking Pin for First Pair of Push Handles |
| 149 | Locking Pin on Each Second Push Handle |
| 150 | Weight Plate Horn |
| 160 | Tow Hook |
| 170 | Posts or Sleeves for Second Push Handles |
| 170z | Central Axis of Post or Sleeve |
| 179 | Locking Slot in Each Post or Sleeve |
| 180 | Braking Mechanism |
| 185 | Braking Level Adjustment Lever |
| 190 | Rubber Bumpers |
| 200 | Wall Hanging Bracket Set |
| 201 | Upper Bracket |
| 201h | Upper Bracket Hook or Loop |
| 201p | Upper Bracket Contact Support Points |
| 202 | Lower Bracket |
| 202h | Lower Bracket Hook or Loop |
| 202p | Lower Bracket Contact Support Point |
| 203 | Posts or Sleeves for Second Push Handles |
| 300 | Elongate Flexible Exercise Pull (e.g. pull strap, battle rope, elastic band, etc.) |
| x | Longitudinal Direction |
| y | Lateral Direction |
| z | Transverse Direction |

Construction

With reference to the illustrative drawings, the invention is directed to a wheeled weight training sled 100 (hereinafter "sled") and a wall hanging bracket set 200 for supporting a weight training sled such as sled 100 in an elevated vertical stowage position.

Wheeled Sled

Referring to FIGS. 1-9 and 15-17, the wheeled sled 100 includes a chassis 110, at least two wheels 130, two pair of push handles 140 with a pair proximate each longitudinal end 101 and 102 of the sled 100, and at least one braking mechanism 180. The wheeled sled 100 preferably includes at least one of (i) three fixed-directional wheels 130 comprised of a single front wheel 131 mounted upon a first axle 121 proximate the first longitudinal end 101 of the sled 100 and a pair of rear wheels 132 mounted upon a second axle 122 proximate the second longitudinal end 102 of the sled 100, (ii) a push handle pivot feature wherein a first pair of the push handles 141 proximate the front or first longitudinal end 101 of the sled 100 is pivotable as a unit about a laterally y extending pivot axis 146 as between an upward use position and a lowered stowage position extending towards the rear or second longitudinal end 102 of the sled 100, (iii) a tow hook 160 mounted between and pivotable with the first pair of push handles 141, and (iv) a push handle conformation adjustment feature wherein the second pair of push handles 142 are curvilinear and releasably engageable with a post or sleeve 170 extending upward from the chassis 110, and rotatable up to 180° about a central axis 170z of each post or sleeve 170 as between a first axially rotated locked position and a second axially rotated locked position.

The wheeled sled 100 has longitudinally x spaced first and second ends 101 and 102, and laterally y spaced first and second sides 103 and 104.

Figure 2:
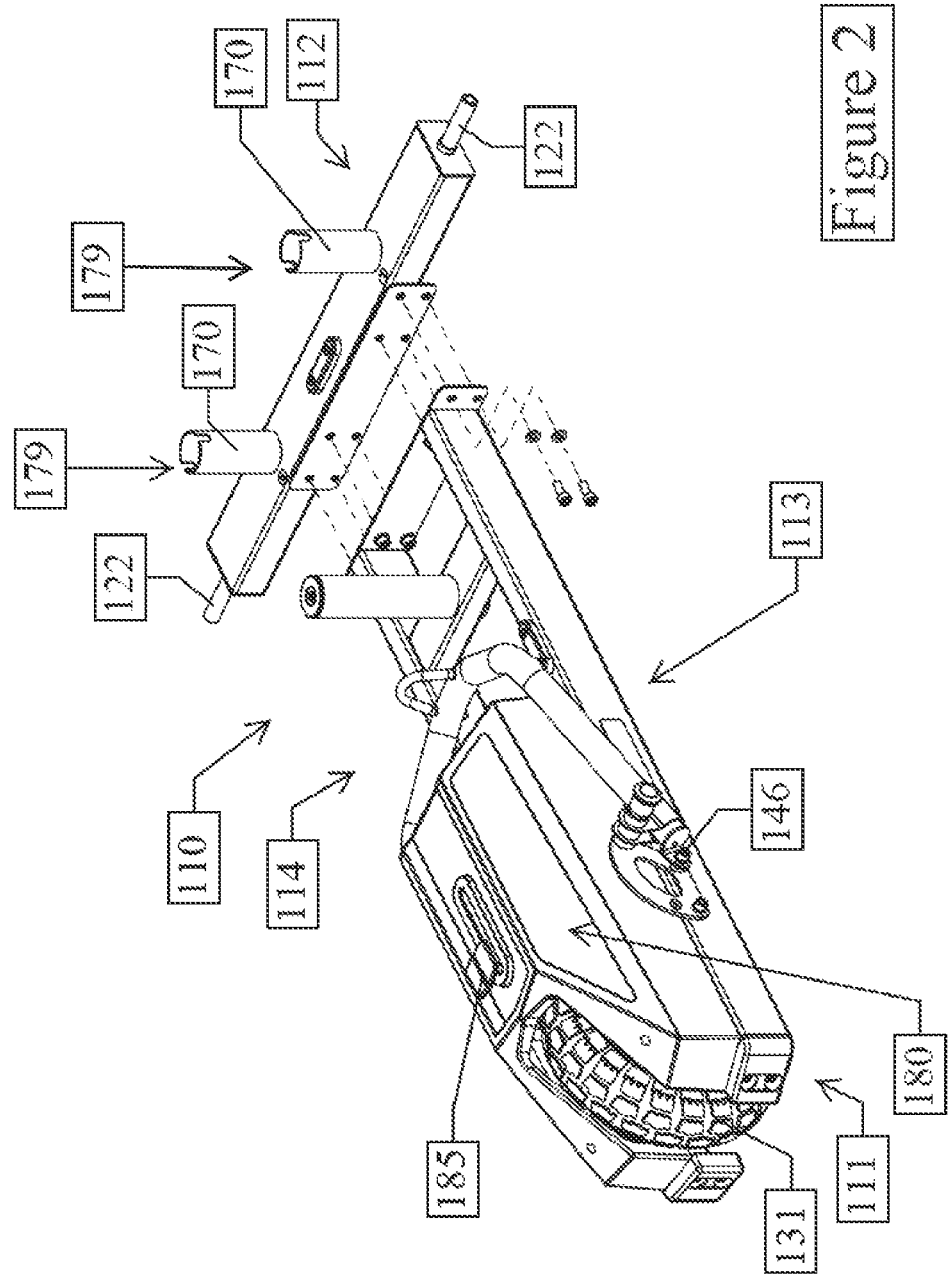
FIG. 2 is a partially exploded perspective view of the invention depicted in FIG. 1 sans rear wheels and the second pair of push handles, with the first pair of push handles pivoted into the stowage position.
Figure 3:
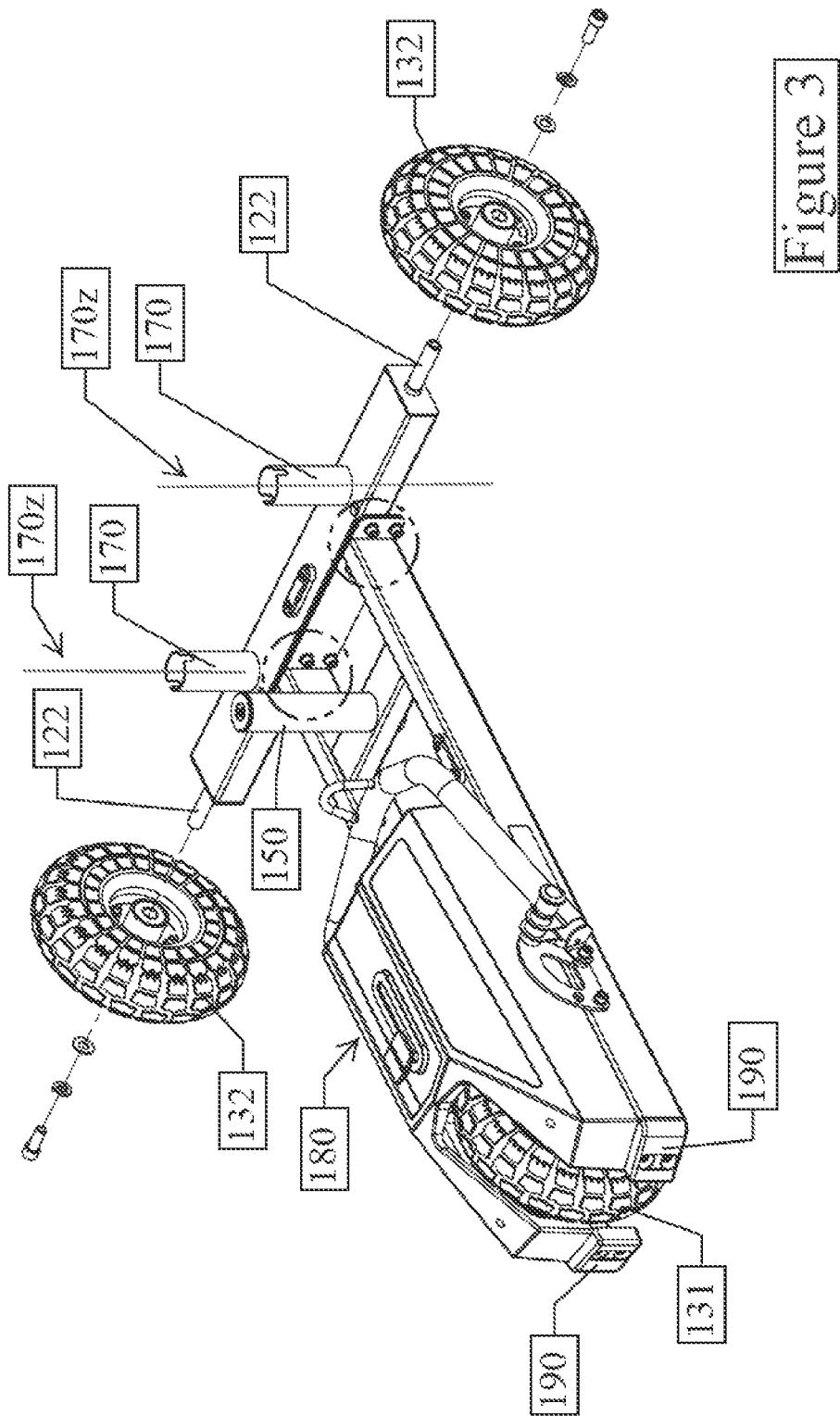
FIG. 3 is a partially exploded perspective view of the invention depicted in FIG. 1 sans second pair of push handles, with the first pair of push handles pivoted into the stowage position.

Referring to FIGS. 2, 3 and 16, a preferred chassis 110 is a metal structure having first and second longitudinally x elongated and laterally y spaced side rails 117 and 118 rigidly interconnected by cross-beams 119, defining a chassis 110 with first and second longitudinal ends 111 and 112, first and second lateral sides 113 and 114, and a transversely z spaced top 115 and bottom 116.

Referring to FIGS. 1, 3-9 and 15-17, the wheels 130 are rotatably mounted to the chassis 110 for supporting the bottom 116 of the chassis 110 a distance above a surface (hereinafter referenced as "clearance"). The wheels 130 can be fixed-directional wheels 130 so as to constrain the chassis 110 to reciprocating travel upon a surface along a substantially linear longitudinal x path.

When two wheels 130 are employed they are preferably longitudinally x aligned in the midsagittal plane of the sled 100. When three wheels 130 are employed they are preferably spaced at the corners of an isosceles triangle with two of the wheels 130 laterally y aligned proximate one end 102 of the sled 100 and the third centrally positioned proximate the other end 101 of the sled 100. When four wheels 130 are employed the wheels 130 are mounted in laterally y spaced pairs upon each of two laterally y extending axles 121 and 122 mounted proximate each longitudinal end 101 and 102 of the sled 100 with the wheels 130 in each pair of wheels mounted proximate opposite sides 103 and 104 of the sled 100. Alternatively, the four wheel embodiment may employ a pair of longitudinally x aligned and laterally y centered wheels 130 proximate the longitudinal ends 101 and 102 of the sled 100, with a vertically z raised or vertically z aligned outrigger wheel 130 extending from each side 103 and 104 of the sled 100.

The wheels 130 are preferably pneumatic wheels 130 with good traction in order to limit undesired sliding of the wheels 130 across the floor during exercise as opposed to desired rotation of the wheels 130.

Referring to FIGS. 1, 4-9 and 15-17, the sled 100 includes two pair of push handles 141 and 142, with a first pair of push handles 141 secured to the first end 101 of the sled 100, preferably secured to the first ends 117a and 118a of the chassis side rails 117 and 118, and a second pair of push handles 142 secured to the second end 102 of the sled 100, preferably secured to the second ends 117b and 118b of the chassis side rails 117 and 118. This allows a user to exercise by pushing the sled in either direction along the longitudinal x path of travel.

Figure 6:
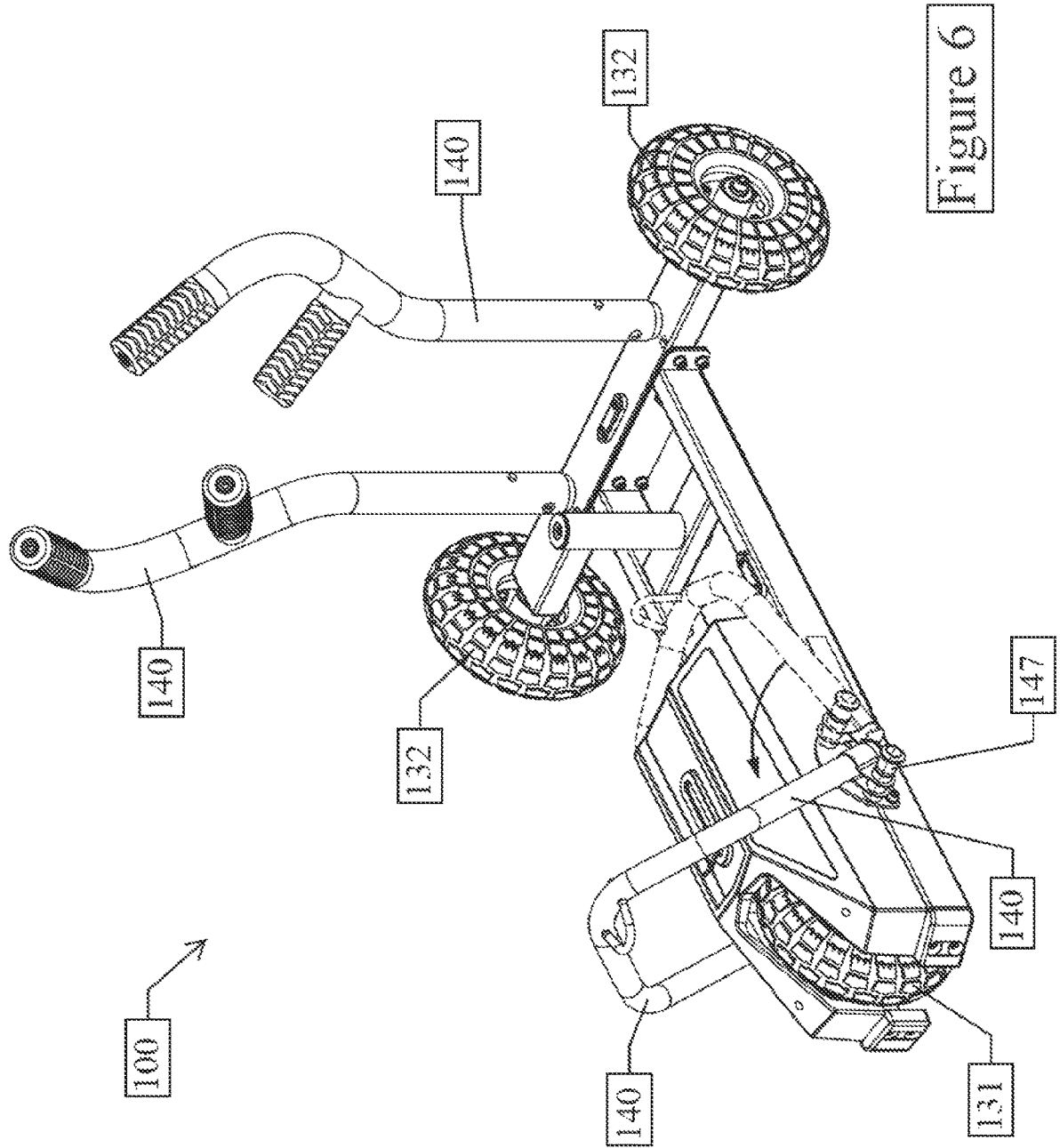
FIG. 6 is a front perspective view of the invention depicted in FIG. 1 depicting the use and stowage pivot positions of the first pair of push handles.
Figure 7:
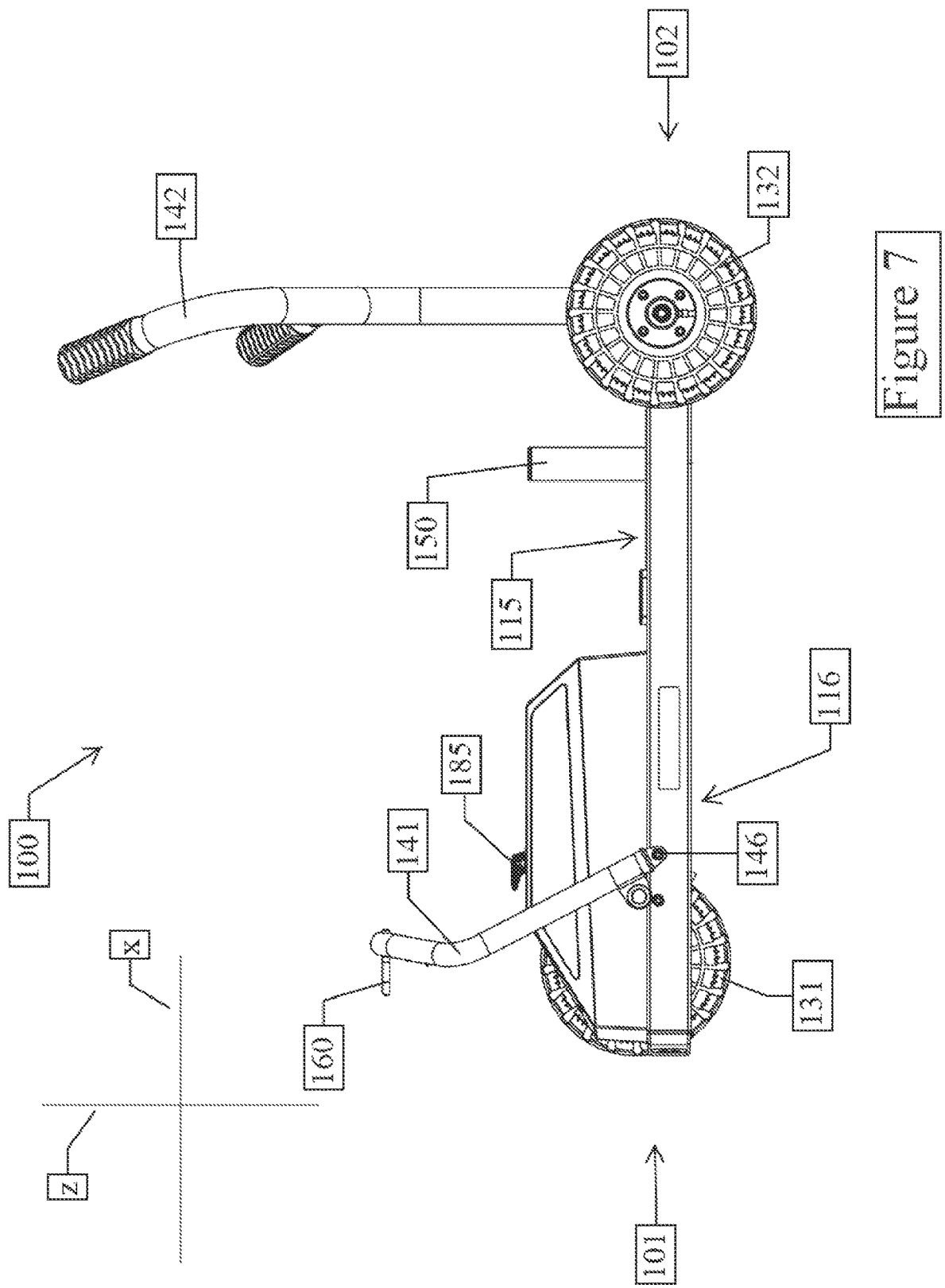
FIG. 7 is a side view of the invention depicted in FIG. 1.
Figure 12:
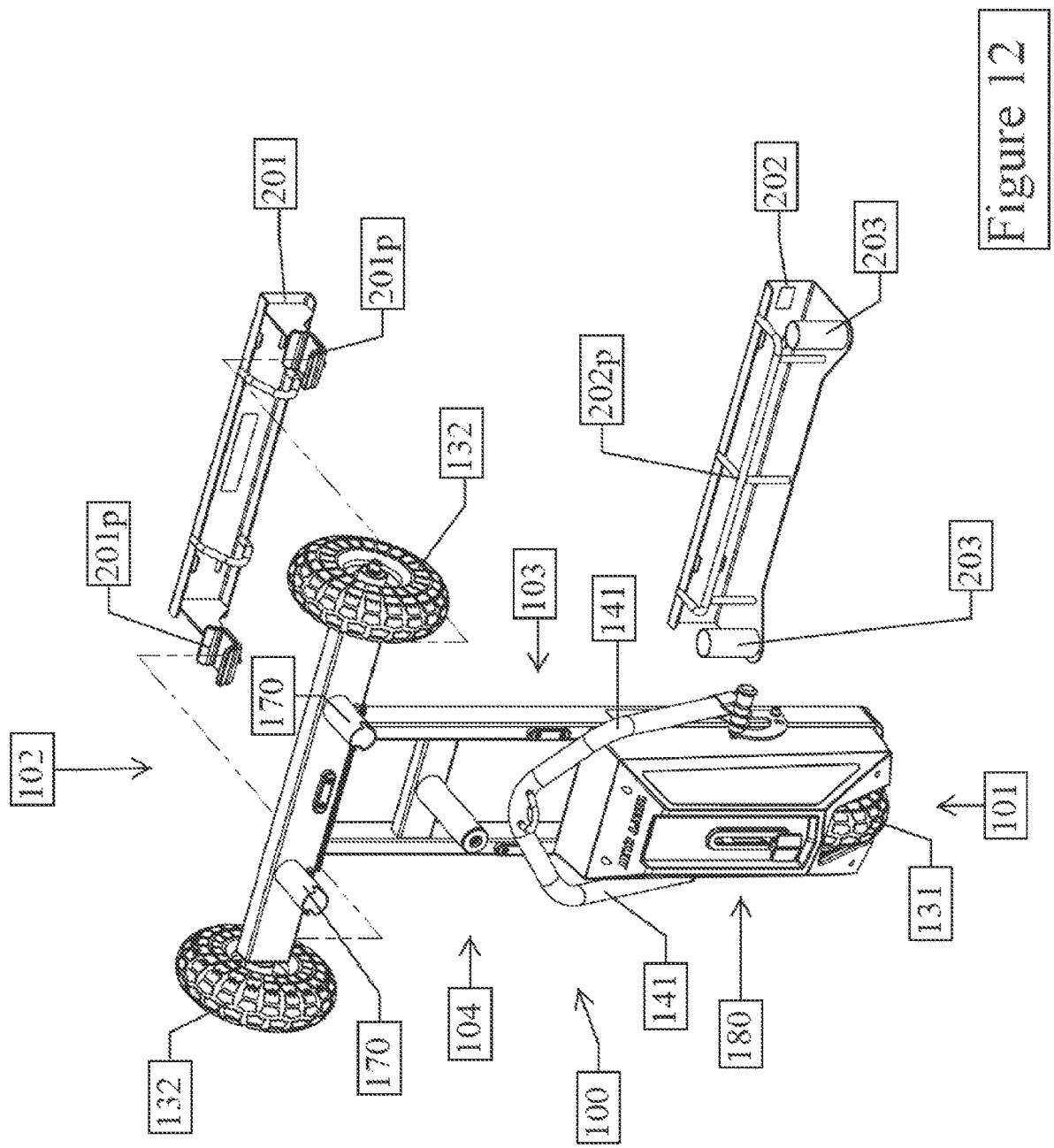
FIG. 12 is a front perspective view of the weight training sled depicted in FIG. 3 and the wall hanging bracket set depicted in FIG. 10 in hanging spatial relationship to one another.
Figure 13:
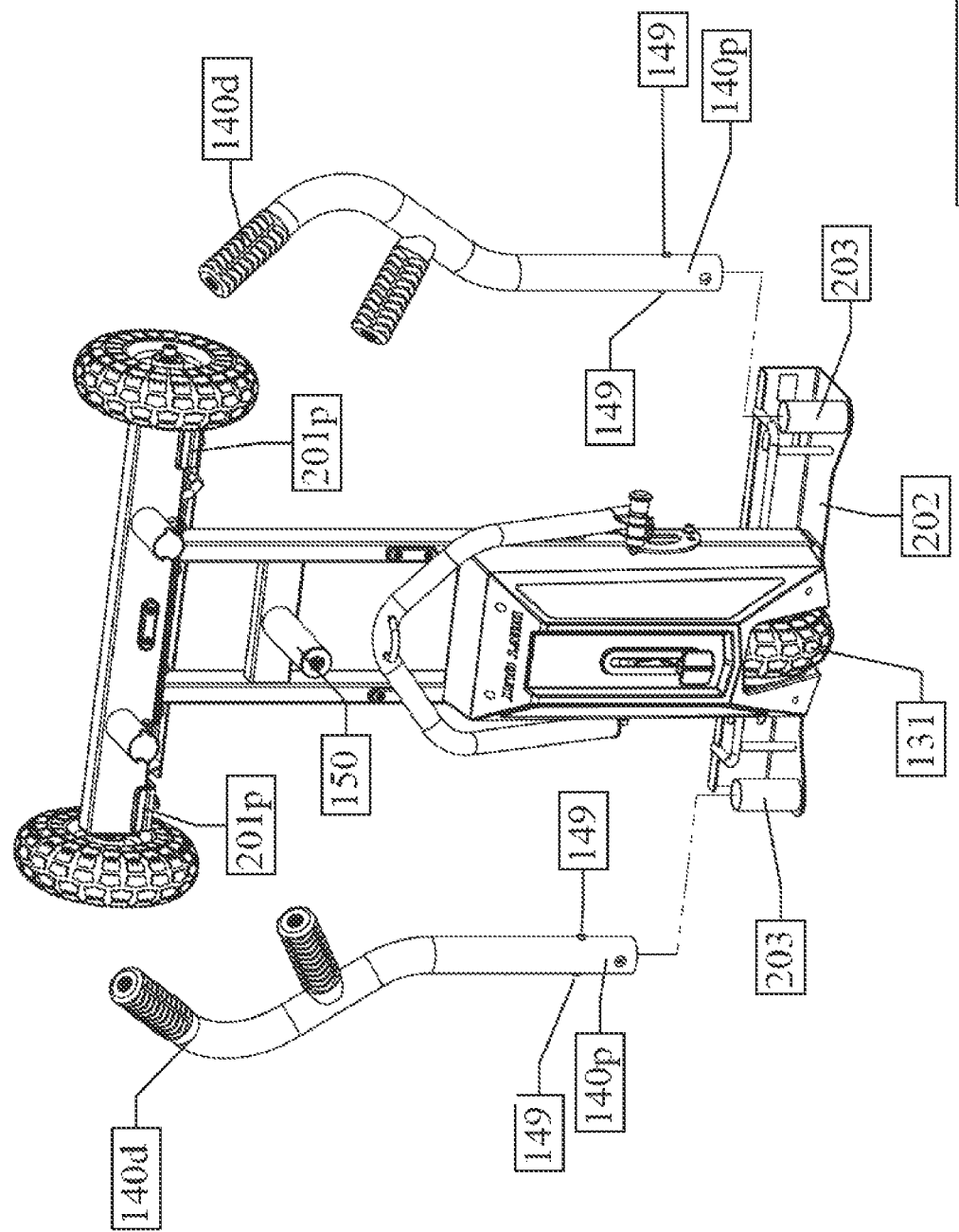
FIG. 13 is a front perspective view of the weight training sled depicted in FIG. 3 hanging from the wall hanging bracket set depicted in FIG. 10 and detached second push handles shown in mounted spatial relationship to the wall hanging bracket set.

Referring to FIG. 6, the first pair of the push handles 141 can be configured and arranged to pivot as a unit about a laterally y extending pivot axis 146 as between an upward use position and a lowered stowage position extending towards the rear or second longitudinal end 102 of the sled 100. The first pair of push handles 141 can be releasably locked in the upward use position and a lowered stowage position by a spring biased locking pin 147 attached to the first pair of push handles 141 for pivoting with the first pair of push handles 141, which can be selectively inserted into at least two radially spaced orifices (not numbered) attached to the chassis 110.

Figure 4:
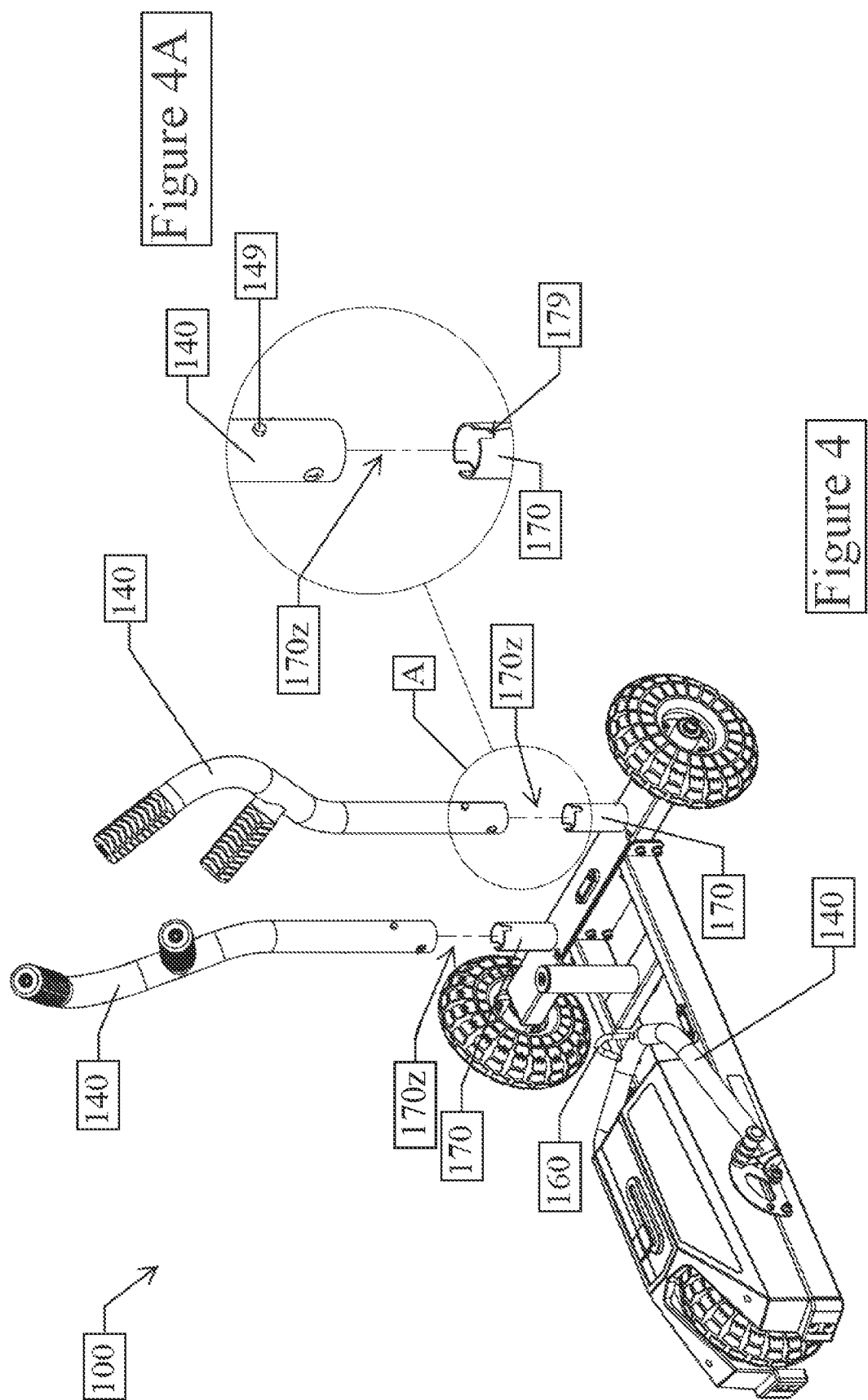
FIG. 4 is a perspective view of the invention depicted in FIG. 1 with detached second pair of push handles, with the first pair of push handles pivoted into the stowage position.
Figure 5:
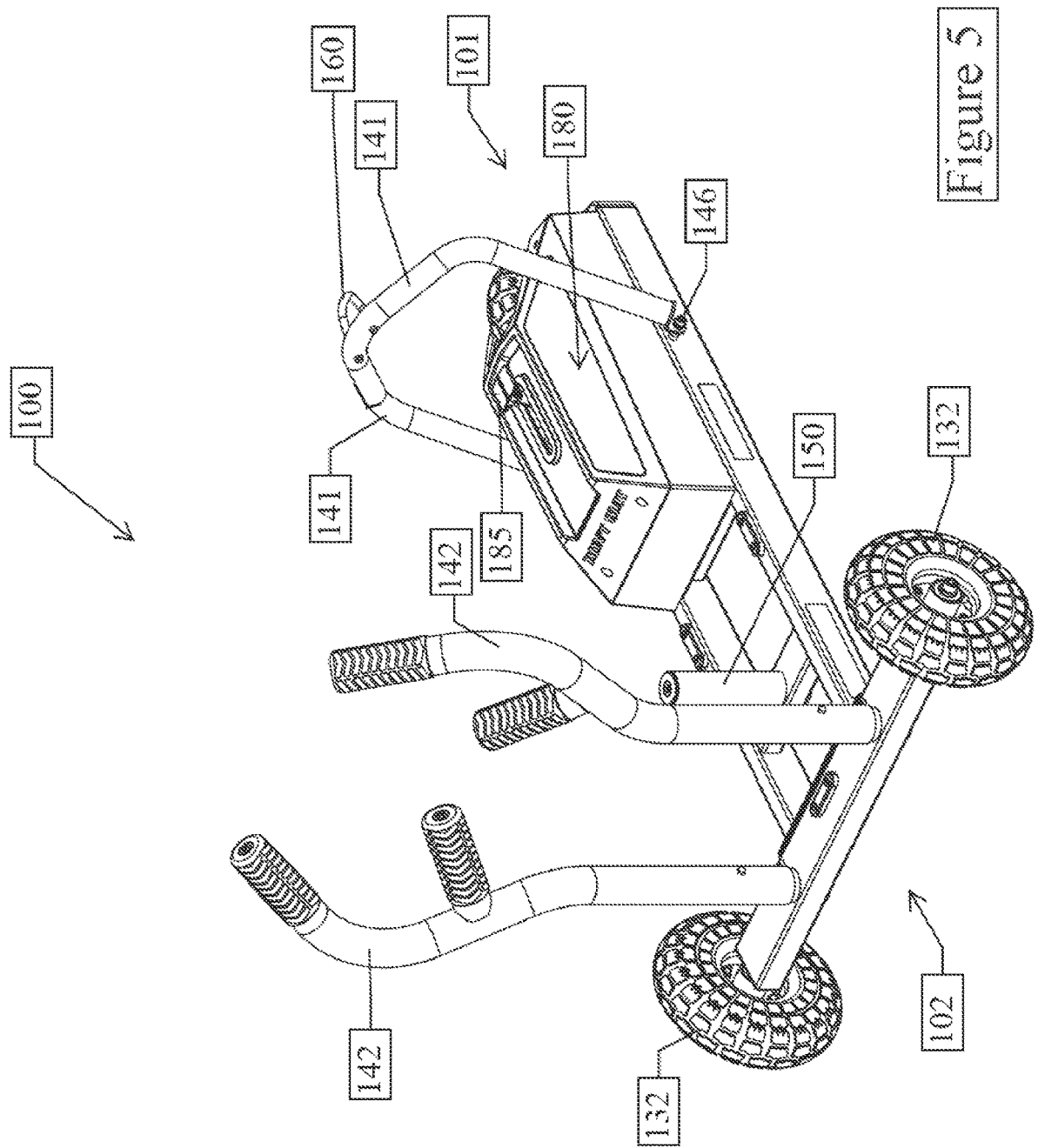
FIG. 5 is a rear perspective view of the invention depicted in FIG. 1 with the first pair of push handles pivoted into the use position.

Referring to FIGS. 4 and 4A, the second pair of push handles 142 can be configured and arranged to allow conformational adjustment of the push handles 142 on the sled 100 by releasably engaging each of the push handles 142 to the sled 100 via a post or sleeve 170 extending upward from the chassis 110, and configuring the push handles 142 and the posts or sleeves 170 with cross-sectional shapes that allows each push handle 142 to be engaged with a post or sleeve 170 at different rotated angles of up to 180° about a central axis 170z of each post or sleeve 170 thereby allowing mounting of the push handles 142 as between a first axially rotated locked position and a second axially rotated locked position. The second pair of push handles 142 can be releasably locked in each axially rotated position by a locking pin 149 at the proximal end 140p of each handle 142 that engages locking slots 179 in the distal end (unnumbered) of each post or sleeve 170.

Referring to FIGS. 1, 4-9 and 15-17, the second pair of push handles 142 are preferably curvilinear, with grips 143 proximate the distal ends 140d of the push handles 142 that angle inward towards one another and downward towards the chassis 110 when in one of the axially rotated locked positions.

Inward angling of the grips 143 provides a more natural ergonomic rotational gripping position, while downward angling of the grips 143 redirects at least some of the vertical force vector created when a user is pushing the sled 100 from an upwardly directed force vector to a downwardly directed force vector, thereby preventing or at least limiting lifting of the work end of the sled 100 off the ground.

Referring to FIGS. 8, 8A, 9 and 9A, a tow hook 160 can be mounted between and pivotable with the first pair of push handles 141. The distal end 140d of the first pair of push handles 141 can be interconnected by an interconnecting member 145. This interconnecting member 145 provides both stabilization of the paired push handles 141 and an elevated position for attachment of an elongate flexible exercise pull 300 such as a pull strap, battle rope, elastic band, etc. to the sled 100. A tow hook 160 preferably extends longitudinally x outward from the lateral y center of this interconnecting member 145 to facilitate temporary attachment of an elongate flexible exercise pull 300. The interconnecting member 145 can also be gripped by a user pushing the sled 100 as an alternative gripping position.

Referring to FIGS. 8, 8A, 9 and 9A, the interconnecting member 145, and thereby the tow hook 160, is preferably located so as to provide a clearance of at least 30 cm between the tow hook 160 and ground when the first pair of push handles 141 are pivoted into the use position. Such elevated positioning of the tow hook 160 serves to limit the amount of upward force vector created when a user pulls upon a elongate flexible exercise pull 300 attached to the sled 100 at the tow hook 160, thereby limiting and potentially eliminating lifting of the first or front end 101 of the sled 100 off the ground.

Referring to FIGS. 1-9 and 15, one or more weight plate horns 150 can be provided on the chassis 110 for mounting weight plates (not shown) onto the top 115 of the chassis 110 in order to increase exercise resistance offered by the sled 100 and, more importantly, counteract any upward lifting force vector exerted by a user that would tend to lift an end of the sled 100 and thereby lift the wheel(s) 130 closest to the user off the floor. The preferred embodiment has a weight plate horn 150 positioned along the midsaggital plane of the sled 100 secured to a cross beam 119. Rubber pads (not shown) can be provided atop the chassis 115 proximate the horn 150 for cushioning and protecting the chassis 110 when weight plates are added to or removed from the horn 150.

Referring to FIGS. 1-9 and 15-17, a braking mechanism 180 is attached to the chassis 110 and in communication with at least one of the wheels 130, preferably in communication with the first or front wheel 131, for exerting a bidirectional controlled variable resistive force against rotation of the wheel(s) 130 along the longitudinal x path of travel. Separate braking mechanisms 201 and 202 can be provided for each wheel 130 or each axle 120. Many types of resistance devices are known such as braking motors, generators, brushless generators, eddy current systems, magnetic systems, alternators, tightenable belts, friction rollers, fluid brakes, etc., any of which could be effectively utilized in the present invention. A braking mechanism capable of providing progressive resistance based upon acceleration or speed of travel is generally preferred.

In further detail, a preferred braking mechanism 180 is an eddy current brake mounted to a side rail 117 or 118 of the chassis 110 for exerting resistance to rotation of the first axle 121. An eddy current brake generally includes (i) a mounting plate which would be rigidly attached to the chassis 110, (ii) a drive sprocket rotatably with and secured to a portion of the first axle 121 extending through an orifice in the mounting plate, (iii) a pulley assembly with a pulley and driven sprocket rotatably mounted via an internal hub and a sprocket mount onto a first mounting post projecting from the mounting plate in rotatable driven communication with the drive sprocket via a drive chain, (iv) an eddy disk assembly comprised of an eddy disk rotatably mounted via a disk mount having a shaft and mounting plate onto a second mounting post projecting from the mounting plate in rotatable driven communication with the pulley assembly via a drive belt, (v) a drive belt tensioning assembly secured within an adjustment slot in the mounting plate for adjustably tensioning the drive belt, and (vi) a magnetic stator assembly secured to the mounting plate for manual (as shown) or automatic (not shown) repositioning of the magnets relative to the eddy disk of the eddy disk assembly via an adjustment slot in the mounting plate or a multi-stop lever 185 as depicted in FIGS. 15 and 15A, to increase or decrease resistance as desired.

Referring to FIGS. 15 and 15A, in a preferred embodiment the braking mechanism 180 is adjustable into a neutral resistance setting, whereby the sled 100 is effectively converted from an exercise sled to a transport wagon. The neutral setting facilitates movement of the sled 100 from one location to another, such as transport back and forth between a storage location and a use location. The neutral setting preferably applies some modest resistance to rotation of the wheels which does not appreciably interfere with transport of the sled 100 but is effective for preventing or at least slowing down gravity induced movement of the sled 100.

A protective shroud (unnumbered) may be provided over the components of the braking mechanism 180.

Rubber bumpers 190 can be provided on the front end 101 of the sled 100 to minimize any structural damage should a user strike an object while pushing the sled 100.

Various acceptable, preferred and most preferred dimensions having some significance to the value and/or performance of the sled 100 are provided below.

| Dimension | Acceptable (cm) | Preferred (cm) | Most Preferred (cm) |
|---|---|---|---|
| Chassis | | | |
| Longitudinal Length of Chassis | 60-150 | >100 | 100-140 |
| Maximum Lateral Width of Chassis | 30-100 | 40-80 | 50-60 |
| Maximum Transverse Height of Chassis | 3-30 | 5-20 | 10-20 |
| Clearance | >2 | 5-20 | 10-15 |
| Wheels | | | |
| Wheelbase | 60-100 | >80 | 80-100 |
| Track | 40-100 | 60-100 | 80-100 |
| Second Push Handles | | | |
| Height relative to Floor | 40-120 | 50-100 | 60-100 |
| Lateral Spacing at Top End | 70-120% of Track | 80-100% of Track | 80-90% of Track |

Wall Hanging Bracket Set

Referring to FIGS. 10-14, the wall hanging bracket set 200 includes an upper laterally y elongated bracket 201 and a lower laterally y elongated bracket 202. The upper bracket 201 is configured and arranged for attachment to a vertical surface and for supportively contacting the second longitudinal end 102 of the sled 100 at two laterally y spaced contact points 201p when attached to the vertical surface. The contact points 201p on the upper bracket 201 preferably engage the chassis 110 of the sled 100. The lower bracket 202 is configured and arranged for attachment to the same vertical surface and, when attached to the vertical surface at a defined distance away from and vertically below the attached upper bracket 201, can supportively contact a first longitudinal end 101 of the sled 100 at a single contact point 202p. The contact point 202p on the lower bracket 202 preferably engages the front wheel 131 of the sled 100.

Referring to FIGS. 10-14, the lower bracket 202 preferably includes upward projecting sleeves or posts 203 upon which the second pair of push handles 142 can be secured for storage when detached from the chassis 110.

Referring to FIGS. 10 and 12-14, the wall hanging bracket set 200 preferably has a low mounted horizontal projecting profile, with each of the upper 201 and lower 202 brackets extending less than 6 inches away from a vertical surface upon which the brackets 201 and 202 are attached.

In a preferred embodiment, the wall hanging bracket set 200 includes at least one hook or loop 201h and/or 202h available for use in attaching one end of an elongate flexible exercise pull 300 while a weight training sled 100 is supported upon the hanging bracket set 200. The at least one hook or loop 201h and/or 202h can be provided on either the upper 201 or lower 202 bracket, with a preference for providing at least one hook or loop 201h and 202h on each of the upper 201 and lower 202 brackets respectively.

Use

The sled 100 can be conveniently and safely used in a confined space as small as 1.2 meters wide and 5 meters long, by (i) setting the braking mechanism(s) 180 to the desired resistance, (ii) standing at the second end 102 of the sled 100, (iii) leaning forward and gripping the second pair of push handles 142, (iv) pushing the sled 100 in a first longitudinal x direction along a longitudinal path, (v) walking around the sled 100 to the first end 102 of the sled 100, (vi) leaning forward and gripping the first pair of push handles 141, (vii) pushing the sled 100 in a second longitudinal x direction back along the longitudinal path, (viii) walking back around the sled 100 to the second end 102 of the sled 100, and (ix) repeating steps (iii)-(viii) for as many reps as desired.

Alternatively, the sled 100 can be conveniently and safely used in a confined space as small as 1.2 meters wide and 5 meters long, by (i) setting the braking mechanism(s) 180 to the desired resistance, (ii) standing at the second end 102 of the sled 100, (iii) leaning forward and gripping the second pair of push handles 142, (iv) pushing the sled 100 in a first longitudinal x direction along a longitudinal path, (v) tilting the first end 101 of the sled 100 up until the front wheel 131 loses contact with ground, (vi) rotating the sled 101 180° with only the rear wheels 132 in contact with ground, (vii) pushing the sled 100 in a second longitudinal x direction back along the longitudinal path, and (viii) repeating steps (v)-(vii) for as many reps as desired.

We claim:

1. A weight training sled, comprising:
    (a) a chassis having longitudinally spaced first and second ends and laterally spaced first and second sides,
    (b) at least two longitudinally spaced rotatable wheels for supporting the chassis a vertical distance above a support surface,
    (c) a brake for applying progressive resistance to rotation of at least one of the at least two longitudinally spaced rotatable wheels,
    (d) a first pair of laterally spaced push handles extending upward from proximate the first end of the chassis wherein the first pair of laterally spaced push handles are pivotable as a unit about a laterally extending pivot axis as between an upward use position extending past vertical and towards the first end of the chassis and a lowered stowage position extending towards the second end of the chassis, and
    (e) a second pair of laterally spaced push handles extending from proximate the second end of the chassis wherein each push handle of the second pair of laterally spaced push handles is (i) curvilinear, (ii) releasably engageable with a post or sleeve extending upward from the chassis, and (iii) rotatable about a central axis of each of the post or sleeve as between a first axially rotated locked position and a second axially rotated locked position.

2. The weight training sled of claim 1 further comprising a tow hook mounted between and pivotable with the first pair of laterally spaced push handles.

3. The weight training sled of claim 1 wherein the angle of rotation between the first rotated locked position and the second rotated locked position is 180°.

* * * * *